United States Patent [19]

Nishioka et al.

[11] Patent Number: 5,642,182
[45] Date of Patent: Jun. 24, 1997

[54] SCANNING APPARATUS WITH MEANS TO CONTROL THE FREQUENCY OF VIBRATIONS WITHIN THE SCANNER

[75] Inventors: Yukinori Nishioka; Nobuhiko Ogura, both of Kanagawa-ken, Japan

[73] Assignee: Fuji Photo Film Co., Ltd., Kanagawa, Japan

[21] Appl. No.: 580,184

[22] Filed: Dec. 28, 1995

[30] Foreign Application Priority Data

Oct. 1, 1995 [JP] Japan .................. 7-002017

[51] Int. Cl.$^6$ .............. G03B 27/52; G03B 27/42; G03B 27/62; H04N 1/04
[52] U.S. Cl. .............. 355/55; 355/52; 355/53; 355/75
[58] Field of Search .............. 355/50, 52, 53, 355/55, 71, 75; 250/590; 271/259, 266; 378/34, 35, 39, 70

[56] References Cited

U.S. PATENT DOCUMENTS

| | | | |
|---|---|---|---|
| 4,293,184 | 10/1981 | Minoura et al. | 350/6.3 |
| 4,298,271 | 11/1981 | Sugiura et al. | 355/8 |
| 4,835,386 | 5/1989 | Shimura et al. | 250/327.2 |
| 5,309,198 | 5/1994 | Nakagawa | 355/67 |
| 5,583,663 | 12/1996 | Boeve | 358/487 |

*Primary Examiner*—William J. Royer
*Assistant Examiner*—Herbert V. Kerner
*Attorney, Agent, or Firm*—Sughrue, Mion, Zinn, Macpeak & Seas

[57] ABSTRACT

A scanning apparatus includes a sheet holder for holding a sheet to be scanned in the shape of a segment of a cylinder, a light source for irradiating the sheet with light, a spinner including a converging lens for converging light from the light source on the surface of the sheet, and a light detector for photoelectrically detecting light from the sheet, a spindle motor including a plurality of rolling balls in a bearing for rotating the spinner coaxially with a center axis of the cylinder, and a sub-scanning device for moving the sheet holder relative to the spinner in a direction parallel to the center axis, and the rolling balls are provided so that the vibrational frequency F of the bearing satisfies the formula $Fb/6 \leq |F - n1 \times Fb| \leq Fb/2$ wherein Fb is the rotational frequency of the spindle motor and n1 is a positive integer. According to the thus constituted scanning apparatus, it is possible to read an image which contain no visibly recognizable wave-like unevenness even when the image is read at high density at a reduced scanning pitch.

8 Claims, 9 Drawing Sheets

SCANNING APPARATUS WITH MEANS TO CONTROL THE FREQUENCY OF VIBRATIONS WITHIN THE SCANNER

BACKGROUND OF THE INVENTION

The present invention relates to a scanning apparatus and, particularly, to such an apparatus for scanning a stimulable phosphor which has been exposed imagewise to light, radiation or an electron beam and stores the energy of light, radiation or an electron beam in the form of an image with an electromagnetic wave to stimulate it, thereby causing it to emit the energy of the light, radiation or an electron beam in the form of image-bearing light, and photoelectrically detecting emitted light, thereby reading the image of light, radiation or an electron beam stored in the stimulable phosphor at high density and without producing any wave-like unevenness in the image.

DESCRIPTION OF THE PRIOR ART

Various methods and systems using a stimulable phosphor for producing image data and reproducing an image on display means such as a CRT or a photographic film based on the produced image data are known.

For example, Japanese Patent Application Laid-Open No. 55-12429 and Japanese Patent Application Laid-Open No. 55-12145 propose a method for storing the energy of radiation transmitted through an object in a stimulable phosphor, then scanning the stimulable phosphor with an electromagnetic wave to stimulate it, photoelectrically detecting light emitted from the stimulable phosphor, producing digital image signals, subjecting the produced digital image signals to a predetermined signal-processing and reproducing an image on display means such as a CRT or a photographic film. This method is widely used in a field of radiographic diagnosis.

Further, Japanese Patent Publication No. 1-60784, Japanese Patent Publication No. 1-60782 and Japanese Patent Publication No. 4-3952 propose an autoradiographic detecting process for detecting locational information regarding a radioactively labeled substance in a specimen by introducing a radioactively labeled substance into an organism, using the organism or a part of the tissue of the organism as a specimen, placing the specimen and a stimulable phosphor layer together in layers for a certain period of time to cause the stimulable phosphor to absorb the energy of radiation, scanning the stimulable phosphor with an electromagnetic wave to stimulate it, photoelectrically detecting light emitted from the stimulable phosphor, producing digital image signals, subjecting the digital image signals to a predetermined signal-processing, and reproducing an image on display means such as a CRT or a photographic film. Further, Japanese Patent Application Laid-Open No. 3-205550 and Japanese Patent Application Laid-Open No. 4-232864 propose a chemiluminescent detecting process for detecting information regarding a high molecular substance such as gene information by selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, storing the energy of the chemiluminescent emission in the wavelength range of visible light generated by the contact of the chemiluminescent substance and the labeling substance in a stimulable phosphor, scanning the stimulable phosphor with an electromagnetic wave to stimulate it, photoelectrically detecting light emitted from the stimulable phosphor, producing digital image signals, subjecting the digital image signals to a predetermined signal-processing and reproducing an image on display means such as a CRT or a photographic film. Moreover, Japanese Patent Application Laid-Open No. 61-51738 and Japanese Patent Application Laid-Open No. 61-93538 propose a detecting method using an electron microscope for effecting elemental analysis, composition analysis, or structural analysis of a metal or nonmetal specimen by irradiating the specimen with an electron beam, storing the energy of the electron beam diffracted by or transmitted through the specimen in a stimulable phosphor, scanning the stimulable phosphor with an electromagnetic wave to stimulate it, photoelectrically detecting light emitted from the stimulable phosphor, producing digital image signals, subjecting to the digital image signals to a predetermined signal-processing and reproducing an image on display means such as a CRT or a photographic film. Further, Japanese Patent Application Laid-Open No. 59-15843 proposes a radiographic diffraction image detecting process for effecting structural analysis of a metal or nonmetal specimen by irradiating the specimen with radiation, storing the energy of the radiation diffracted by the specimen in a stimulable phosphor, scanning the stimulable phosphor with an electromagnetic wave to stimulate it, photoelectrically detecting light emitted from the stimulable phosphor, producing digital image signals, subjecting the digital image signals to a predetermined signal-processing and reproducing an image on display means such as a CRT or a photographic film.

In these methods, it is indispensable to scan a stimulable phosphor storing the energy of light, radiation or an electron beam with an electromagnetic wave to stimulate it, thereby causing it to emit the energy of the light, radiation or an electron beam in the form of light and photoelectrically read the emitted light and, therefore, image reading apparatuses have been proposed for this purpose.

Japanese Patent Application Laid-Open No. 64-32761 discloses an image reading apparatus which can be used in these image reading methods. This image reading apparatus comprises a sheet holding means for holding a stimulable phosphor sheet having a stimulable phosphor layer in the shape of a cylindrical segment, a stimulating light source, a half mirror provided on a light path of the stimulating light for transmitting and/or reflecting the incident stimulating light, a deflecting mirror provided on the center axis of the cylinder for reflecting the stimulating light transmitted through the half mirror toward the stimulable phosphor sheet, a condenser lens for converging the stimulating light reflected by the deflecting mirror onto the stimulable phosphor sheet, a spinner for rotating the deflecting mirror and the condenser lens about the center axis as a common axis and scanning the stimulating light on the stimulable phosphor sheet in a main scanning direction, a sub-scanning means for moving the sheet holding means with respect to the spinner in the direction parallel to the center axis, a detecting lens for converging stimulated emission emitted from the stimulable phosphor sheet and transmitted through the condenser lens and the half mirror, an aperture provided at a convergent position of the stimulated emission converged by the detecting lens and having a size sufficient for transmitting only the converged stimulated emission, and a light detector provided behind the aperture.

This image reading apparatus has advantages in that it is able not only to prevent the flare phenomenon which arises when the stimulating light reflected from the stimulable phosphor sheet enters the stimulable phosphor sheet again and lower the contrast of the image but also to prevent shading which is often produced in the case where the stimulated emission is collected using a conventional transparent light guide one end of which is located along the main scanning line and the other end of which is shaped so as to mate with the light detector, thereby obtaining an image which is free from wave-like unevenness in density and has high contrast.

However, in this image reading apparatus, when data are sampled at a high rate and the sub-scanning rate is lowered for reading the image at higher density, some wave-like unevenness are found to be produced in the read image.

In the case where the sheet to be scanned is scanned with light and reflected light is detected in a conventional scanning apparatus, it is similarly found that some wave-like unevenness are produced in the read image, if the data are sampled at a high rate and the sub-scanning rate is lowered.

SUMMARY OF THE INVENTION

It is therefore an object of the present invention to provide a scanning apparatus comprising sheet holding means for holding a sheet to be scanned in the shape of a cylinder segment, a light source for irradiating the sheet with light, a spinner including light converging means for converging light from the light source on the surface of the sheet, and photoelectrical detecting means for photoelectrically detecting light from the sheet, a spindle motor including a plurality of rolling elements in a bearing for rotating the spinner coaxially with a center axis of the cylinder, and a sub-scanning device for moving the sheet holding means relative to the spinner in a direction parallel to the center axis, which apparatus can read an image which contains no visibly recognizable wave-like unevenness even when an image is read at high density at a reduced scanning pitch.

As a result of their studies for accomplishing the above and other objects of the present invention, the inventors found that if data are sampled at a high rate and the sub-scanning rate is lowered for reading an image at high density at a reduced scanning pitch, the axial vibration of the bearing of the spindle motor for rotating the spinner causes wave-like unevenness in the read image and, based on the following findings, that the above and other objects can be accomplished by providing the rolling elements so that the vibrational frequency F of the bearing satisfies the formula $Fb/6 \leq |F-n1 \times Fb| \leq Fb/2$ wherein Fb is the rotational frequency of the spindle motor and n1 is a positive integer.

The vibrational frequency F of the bearing is generally expressed by the following formula.

$$F = n \times z \times Fc$$

wherein n is a positive integer, z is the number of the rolling elements and Fc is the rotational frequency of the rolling element support member for integrally supporting a plurality of rolling elements.

On the other hand, the rotational frequency Fb of the spinner is constant and the n1th component thereof is expressed to be n1×Fb. More specifically, even though periodical vibrations occur in the spinner each multiple of frequency Fb, these periodical vibrations do not produce any wave-like unevenness in the image. On the contrary, the vibrational frequency F of the bearing is determined by the number z of the rolling elements and the rotational frequency Fc of the rolling element support member and since the bearing causes non-periodical vibrations in the spinner, it causes wave-like unevenness in the read image.

Experiments conducted by the inventors show that the difference between the vibrational frequency F of the bearing and the n1th component n1×Fb of the spinner closest thereto becomes the frequency causing wave-like unevenness in the image.

However, in the case where the difference between the vibrational frequency F of the bearing and each component degree of of the rotational frequency Fb of the spinner is great, since wave-like unevenness in the image caused by the axial vibration of the bearing are generated in a region of high spatial frequency, if the number z of the rolling elements and the rotational frequency Fc of the rolling element support member are selected so that the absolute value of the difference $|F-n1 \times Fb|$ between the value of the vibrational frequency F of the bearing and the value of each component degree of the rotational frequency Fb of the spinner is in a predetermined range, even if wave-like unevenness are produced in the image due to the axial vibration of the bearing, the wave-like unevenness cannot be visibly recognized as wave-like image unevenness and, therefore, it is possible to effectively prevent visibly recognizable wave-like unevenness from being produced in the image.

Based on these findings, this invention makes it possible to prevent visibly recognizable wave-like unevenness from being produced in the read image, even in the case where the image is read at higher density at a reduced scanning pitch, by selecting the number z of the rolling elements and the rotational frequency Fc of the rolling element support member so that the absolute value of the difference $|F-n1 \times Fb|$ between the value of the vibrational frequency F of the bearing and the value of each component degree of the rotational frequency Fb of the spinner is equal to or greater than Fb/6 and is equal to or smaller than Fb/2.

In a preferred aspect of the present invention, the number z of the rolling elements and the rotational frequency Fc of the rolling element support member are selected so that the absolute value of the difference $|F-n1 \times Fb|$ between the value of the vibrational frequency F of the bearing and the value of each component degree of the rotational frequency Fb of the spinner is equal to or greater than Fb/3 and is equal to or smaller than Fb/2.

In a further preferred aspect of the present invention, the sheet to be scanned is a stimulable phosphor sheet having a layer of stimulable phosphor which has been exposed imagewise to light, radiation or an electron beam and store energy of the light, radiation or an electron beam in the form of an image, the light source is a stimulating light source for emitting an electromagnetic wave capable of exciting the stimulable phosphor and the light detecting means is constituted so as to photoelectrically detect light emitted from the layer of the stimulable phosphor stimulated by the electromagnetic wave.

In the present invention, the stimulable phosphor employed for producing an autoradiographic image, a radiographic diffraction image or an electron microscopic image may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x}M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors BaFX xNaX':aEu$^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors $M^{II}FX\ aM^IX'\ bM^{II}X''_2\ cM^{III}X'''_3\ xA:yEu^{2+}$ (where $M^{II}$ is at least one alkaline earth metal selected from the group consisting of Ba, Sr and Ca; $M^I$ is at least one alkaline metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release in the form of light the energy of light having a visible light wavelength stored therein. However, a stimulable phosphor which can be stimulated by light having a visible light wavelength is preferably employed. More specifically, preferably employed stimulable phosphors include metal halophosphates, rare-earth-activated phosphors, aluminate-host phosphors, silicate-host phosphors and fluoride-host phosphors disclosed in UK Patent Application 2,246,197 A.

The above and other objects and features of the present invention will become apparent from the following description made with reference to the accompanying drawings.

DESCRIPTION OF THE PREFERRED EMBODIMENTS

Figure 1:
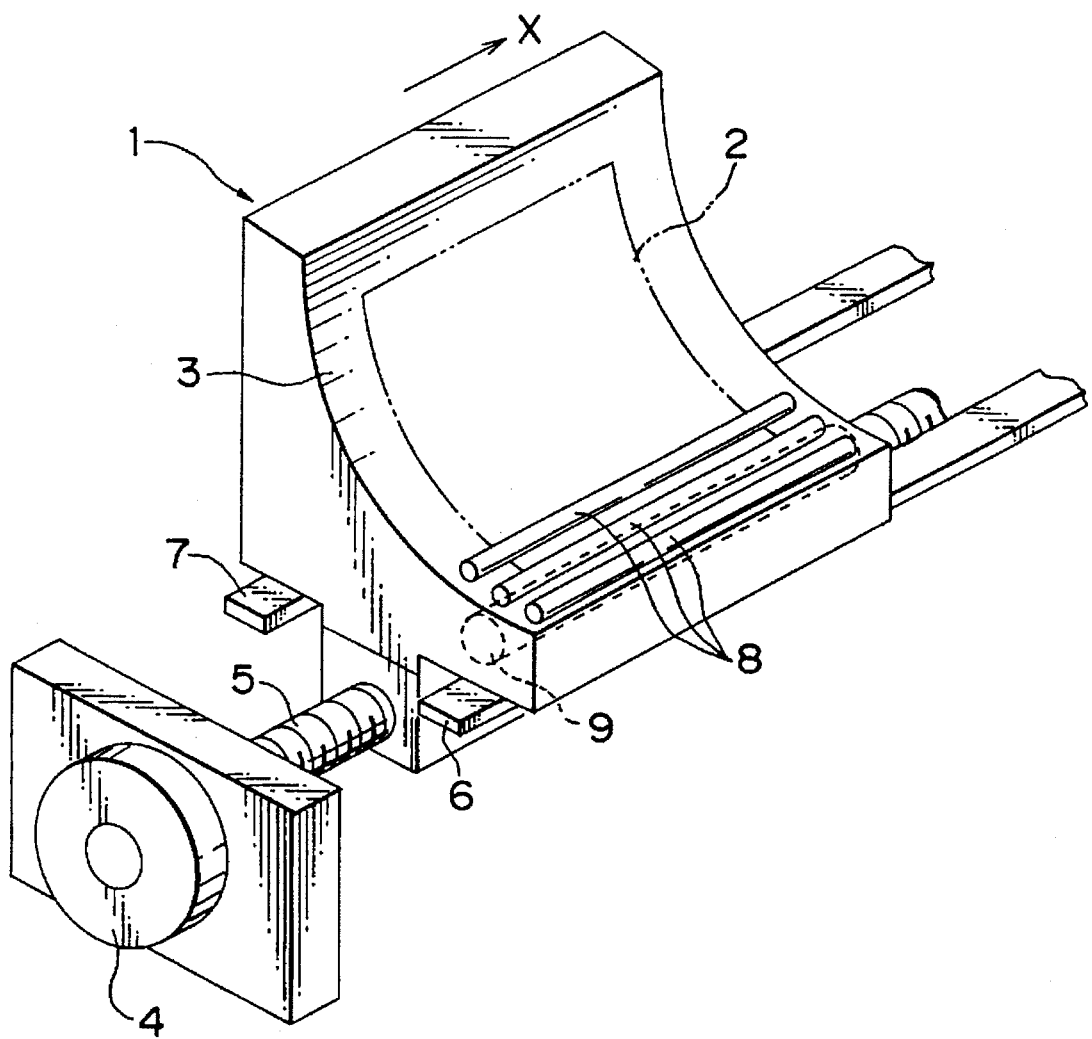
FIG. 1 is a schematic perspective view showing a sheet holding means for holding a sheet used in an image reading apparatus which is an embodiment of the present invention.
Figure 2:
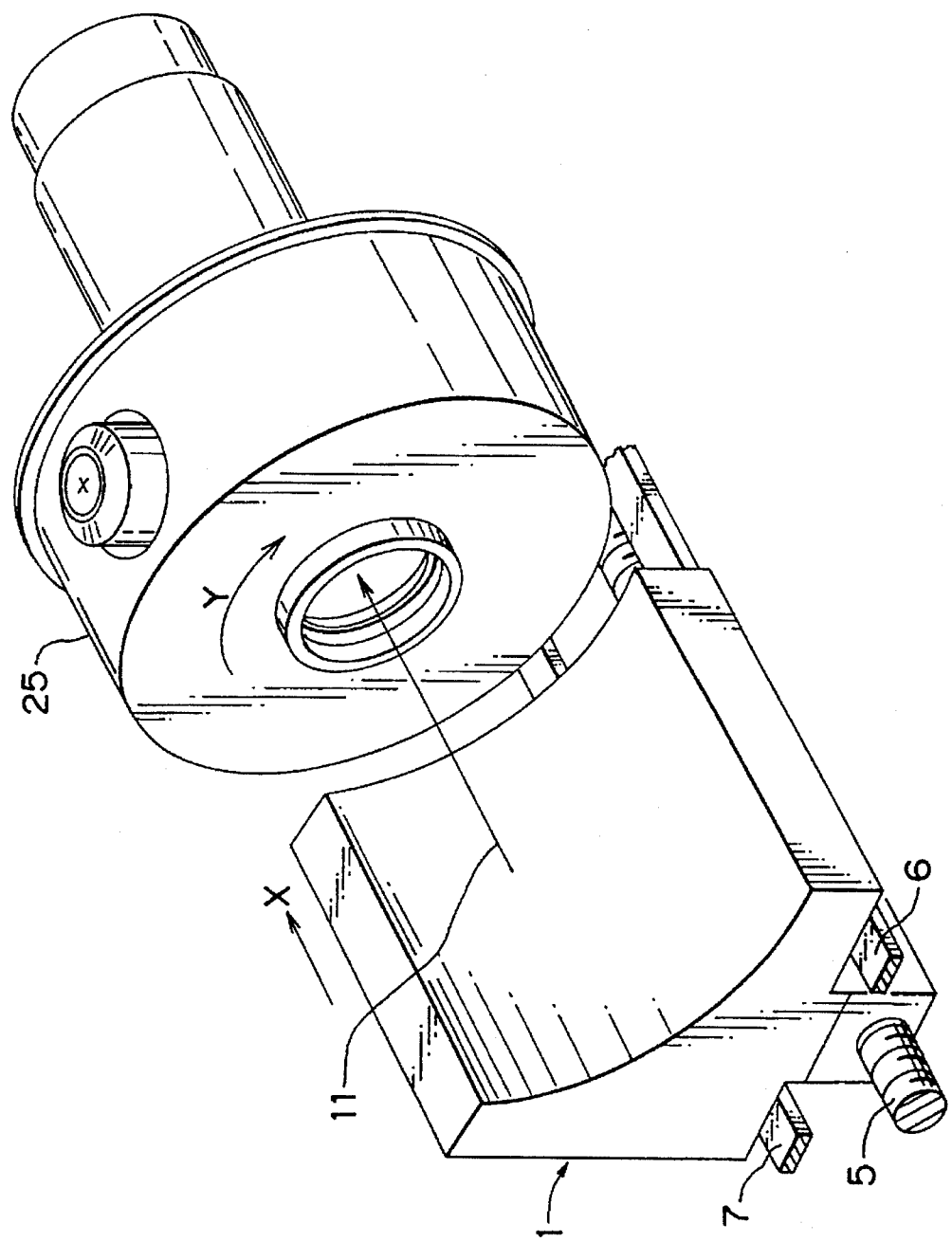
FIG. 2 is a schematic perspective view showing a sheet holding means and a spinner used in an image reading apparatus which is an embodiment of the present invention.

As shown in FIGS. 1 and 2, a sheet holding means 1 is adapted to hold a stimulable phosphor sheet 2 in the shape of a cylinder and the stimulable phosphor sheet 2 has a stimulable phosphor layer (not shown) containing a stimulable phosphor. The stimulable phosphor layer stores image data in the form of the energy of the light, radiation or an electron beam to which is has been exposed.

The sheet holding means 1 has a curved support surface 3 which is inwardly concave in the shape of a cylindrical segment and the stimulable phosphor sheet 2 is held on the curved support surface 3 as shown by phantom lines in FIG. 1. A screw rod 5 connected to the output shaft of a motor 4 is engaged with the lower end portion of the sheet holding means 1 and the sheet holding means 1 can be moved along guide rails 6, 7 in the direction indicated by the arrow X in FIGS. 1 and 2 by the motor 4 rotating the screw rod 5. Rollers 8, 9 for holding the stimulable sheet 2 therebetween and moving it are provided at the lower end portion of the sheet holding means 1. Therefore, it is possible to cause the sheet holding means 1 to hold the stimulable phosphor sheet 2 on the curved support surface thereof by rotating the rollers 8, 9 which hold the stimulable sheet 2 therebetween and to remove the stimulable phosphor sheet 2 held on the curved support surface of the sheet holding means 1 therefrom by reversely rotating the rollers 8, 9.

Figure 3:
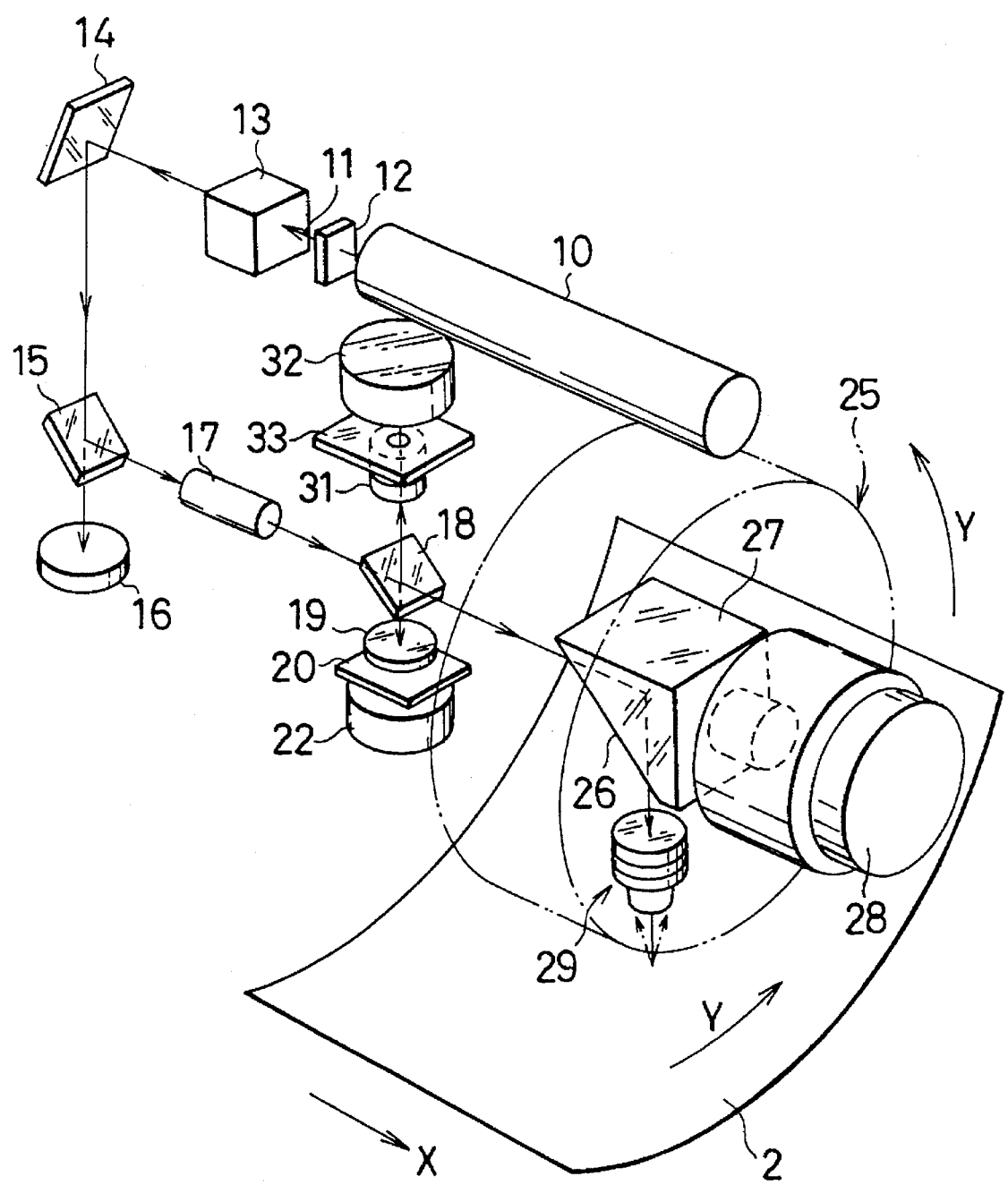
FIG. 3 is a schematic perspective view showing a scanning optical system of an image reading apparatus which is an embodiment of the present invention.
Figure 4:
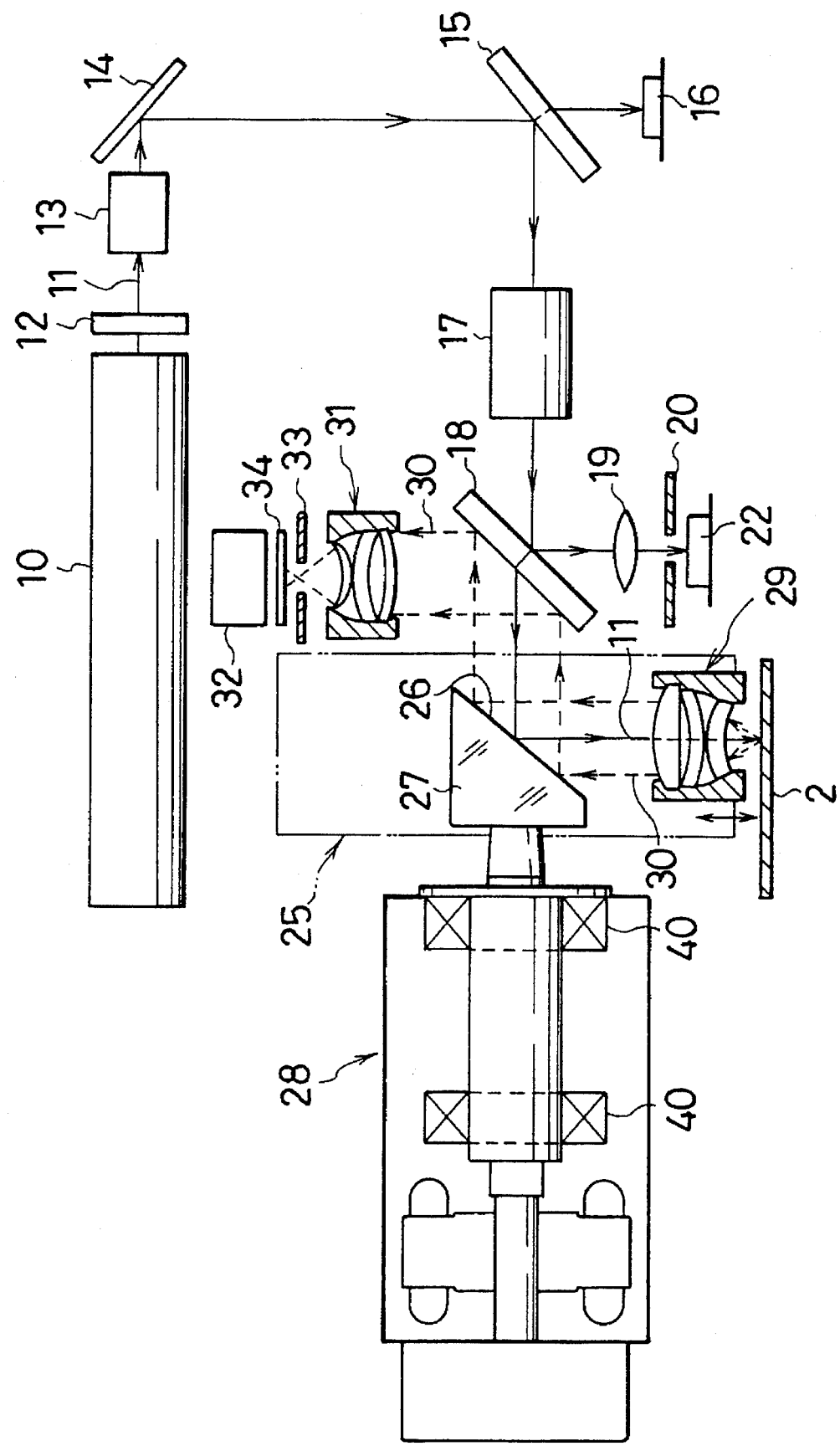
FIG. 4 is a schematic rear view showing a scanning optical system of an image reading apparatus which is an embodiment of the present invention.

FIG. 3 is a schematic perspective view showing the scanning optical system of an image reading apparatus which is an embodiment of the present invention and FIG. 4 is a schematic rear view thereof.

The scanning optical system of the image reading apparatus is adapted to excite the stimulable phosphor constituting the stimulable phosphor layer of the stimulable phosphor sheet 2 with a laser beam after the stimulable phosphor sheet 2 has been exposed to and stored the energy of light, radiation or an electron beam, and to receive the energy of the light, radiation or an electron beam emitted from the stimulable phosphor sheet 2 in response to the excitation in the form of light.

As shown in FIGS. 3 and 4, the scanning optical system includes a helium-neon laser source 10. A laser beam 11 emitted from the helium-neon laser source 10 passes through a filter 12, thereby removing unnecessary wavelengths from the beam, and advances to an acoustooptic modulator (AOM) 13. The laser beam 11 whose intensity has been adjusted by the acoustooptic modulator (AOM) 13 is deflected by two reflecting mirrors 14, 15 so that the light path thereof is changed. The mirror 15 can transmit an extremely small amount of the laser beam incident thereto at a predetermined rate and the laser beam transmitted through the mirror 15 is received by a light detector 16 which monitors the intensity thereof. The light detector 16 controls the acoustooptic modulator 13 in accordance with the intensity of the received laser beam 11 so as to ensure that the intensity of the laser beam transmitted through the acoustooptic modulator 13 is always constant.

The diameter of the laser beam 11 reflected by the mirror 15 is expanded by a beam expander 17 to a predetermined beam diameter and the laser beam 11 passes to a dichroic mirror 18. The dichroic mirror 18 can transmit light having the same wavelength region as that of the laser beam 11 but reflects light having the same wavelength region as that of the stimulated emission from the stimulable phosphor sheet 2. The surface of the dichroic mirror 18 from which the laser beam 11 enters is surface-processed so as to reflect an extremely small amount of the laser beam 11. The reflected laser beam 11 is converged by a convergent lens 19 and passes through an aperture 20 to be received by a light detector 22. The light detector 22 detects whether or not the light axis of the laser beam 11 is at a predetermined position by detecting the incident position of the laser beam 11 on the dichroic mirror 18 and outputs a signal for finely adjusting the positions of the mirrors 14, 15 to a mirror position adjusting means (not shown) in accordance with the incident position of the laser beam 11 on the dichroic mirror 18.

The laser beam 11 transmitted through the dichroic mirror 18 enters a spinner 25 disposed on the light path of the laser beam 11. The spinner 25 is adapted to cause a spindle motor 28 to continuously rotate a deflecting mirror 27, formed with a reflecting surface 26 inclined by 45 degrees, at a high speed, for example, 2000 rpm, in the direction indicated by the arrow Y in FIG. 3. The deflecting mirror 27 is arranged so as to reflect the laser beam 11 at the center axis of the cylinder of which the curved support surface 3 of the sheet holding means 1 is a segment and the length of the light path from the position where the laser beam 11 is reflected by the deflecting mirror 27 to the surface of the stimulable phosphor sheet 2 held on the curved support surface 3 is maintained constant.

A condenser lens 29 is provided in the light path of the laser beam 11 reflected by the deflecting mirror 27 to condense the laser beam entering it into parallel rays which fall incident on a predetermined spot on the surface of the stimulable phosphor sheet 2. In this embodiment, the condenser lens 29 is constituted of three lenses and the length of the light path from the condenser lens 29 to the surface of the stimulable phosphor sheet 2 held on the curved support surface 3 is set to be equal to the focal length "f" of the three lenses. Since the condenser lens 29 can be located at a position close to the stimulable phosphor sheet 2 without need for increasing its diameter, it is possible to converge the laser beam to an extremely small spot using a lens having a small focal length to excite the stimulable phosphor included in the stimulable phosphor sheet 2. The condenser lens 29 is continuously rotated together with the deflecting mirror 27 by the spindle motor 28 in the direction indicated by the arrow Y in FIG. 3 at high speed, for example, 2000 rpm.

Thus, as the spinner 25 is rotated, the surface of the stimulable phosphor sheet 2 held on the curved support surface 3 is scanned with the laser beam 11 in the main scanning direction indicated by the arrow Y in FIG. 3 and since the sheet holding means 1 is moved by the motor 4 in the direction indicated by the arrow X in FIGS. 1 and 2, the surface of the stimulable phosphor sheet 2 is also scanned with the laser beam 11 in the sub-scanning direction, whereby the surface of the stimulable phosphor sheet 2 is two-dimensionally scanned with the laser beam.

Upon irradiation by the laser beam 11, the stimulable phosphor included in the stimulable phosphor sheet 2 is stimulated and emits the light, radiation or electron beam energy stored therein in the form of stimulated emission 30 whose amount is proportional to the intensity of the stored energy. The stimulated emission 30 is emitted from the position irradiated by the laser beam as non-directional light. Then, the stimulated emission is converted to parallel light by passing through the condenser lens 29 spaced from the surface of the stimulable phosphor sheet 2 by its focal length "f" and after it being reflected by the deflecting mirror 27 of the spinner 25, it passes to the dichroic mirror 18. As mentioned above, the dichroic mirror 18 transmits light in the same wavelength region as that of the laser beam 11 but reflects light in the same wavelength region as that of the stimulated emission emitted from the stimulable phosphor sheet 2. The stimulated emission 30 is therefore reflected by the dichroic mirror 18 and enters a detecting lens 31 by which it is converged and then enters a light detector 32 such as a photomultiplier. In this embodiment, the detecting lens 31 is constituted of three lenses. For preventing the stimulated emission emitted from portions of the stimulable phosphor layer other than the predetermined portion irradiated by the laser beam 11 from entering the light detector 32, an aperture 33 which allows only the converged stimulated emission 30 to pass therethrough is disposed at the position where the stimulated emission is converged by the detecting lens 31. More specifically, stimulated emission may be released by a part of the laser beam directed onto the stimulable phosphor sheet 2 and reflected or scattered by the surface of the stimulable phosphor sheet 2, and then reflected from some parts of the apparatus back onto the stimulable phosphor layer formed on the surface of the stimulable phosphor sheet 2 at a portion other than the predetermined portion. However, since the thus released stimulated emission follows a different path from that of the stimulated emission 30 emitted from the predetermined portion of the stimulable phosphor layer through the condenser lens 29, the deflecting mirror 27, the dichroic mirror 18 and the detecting lens 31, this stimulated emission is cut by the aperture 33 and does not enter the light detector 32. Therefore, it is possible to prevent image flare caused by the light detector 32 detecting stimulated emission produced when the laser beam 11 is reflected or scattered by the surface of the stimulable phosphor sheet 2.

Further, a filter 34 allowing only light in the same wavelength region as that of the stimulated emission 30 to pass therethrough is provided on the light receiving surface of the light detector 32 for cutting light of the laser beam 11 reflected by the surface of the stimulable phosphor sheet 2 and passing to the aperture 33 through the condenser lens 29, the deflecting mirror 27, the dichroic mirror 18 and the detecting lens 31 together with the stimulated emission released from the stimulable phosphor layer.

The light detector 32 photoelectrically converts the incident stimulated emission to electrical signals, thereby producing image signals which it outputs to an image signal processing apparatus (not shown). The image signals processed by the image signal processing apparatus in a predetermined manner are input to an image reproducing apparatus (not shown) such as a CRT or a scanning recorder, and a visible image is reproduced on the screen of the CRT (not shown), a photographic film or the like.

Figure 5:
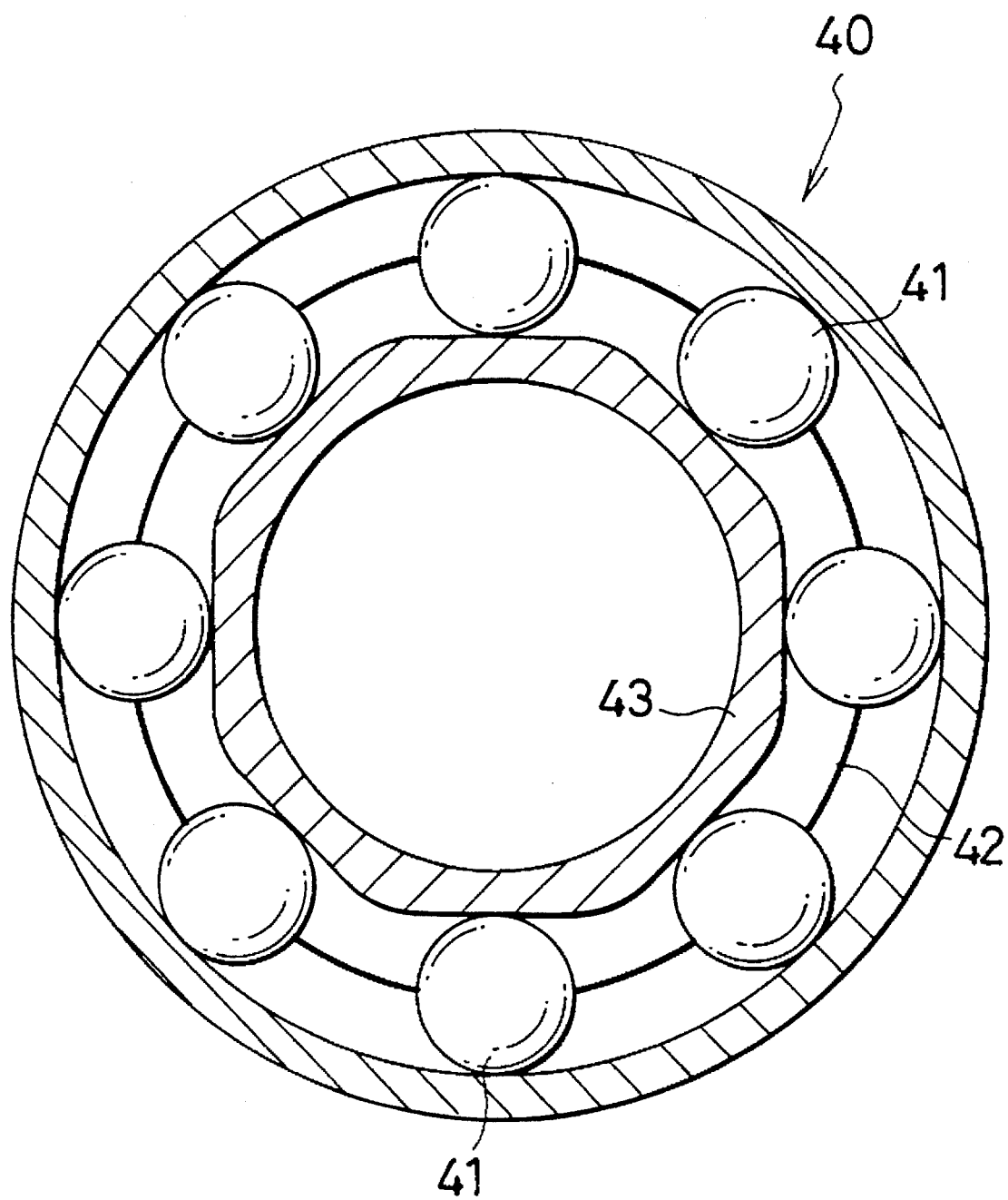
FIG. 5 is a schematic lateral cross-sectional view showing a bearing of a spindle motor.

FIG. 5 is a schematic lateral cross-sectional view of a bearing 40 of the spindle motor 28.

As shown in FIG. 5, eight rolling elements 41 are integrally supported by a rolling element support member 42 in the bearing 40 of the spindle motor 28. In this embodiment, an inner wheel 43 is rotated at 2000 rpm but the rolling element support member 42 does not totally follow the rotation of the inner wheel 43 and rotates at lower speed than that of the inner wheel 43. Therefore, the rolling elements 41 rotate relative to the inner wheel 43, while staying in contact with different portions of the inner wheel 43. However, since the surface of the inner wheel 43 is not perfectly smooth, the bearing 40 vibrates. The vibrational frequency F of the bearing 40 is shown by the following formula.

$$F = n \times z \times Fc$$

wherein n is a positive integer, z is the number of the rolling elements 41 and Fc is the rotational frequency of the rolling element support member 42.

On the other hand, since the rpm of the spindle motor 28, namely, the spinner 25 is 2000 rpm in this embodiment, the rotational frequency Fb of the spinner 25 is about 33.3 Hz. The secondary component, tertiary component and quartic component thereof are 66.7 Hz, 100 Hz and 133.3 Hz, respectively, and the n1th component is n1×33.3 Hz.

In this embodiment, eight rolling elements 41 are used and z equals 8, so that in the case where the rolling element support member 42 has an Fc of 12.919 Hz, F equals 103.35 Hz when n equals 1 and the difference δ F3 between the vibrational frequency F and the tertiary component of the rotational frequency Fb of the spinner 25 is 3.35 Hz.

On the contrary, if nine rolling elements 41 are used, i.e., if z equals 9, then in the case where the rolling element support member 42 has an Fc of 13.44 Hz, the vibrational frequency F equals 121.0 Hz when n equals 1 and the difference δ F4 between the vibrational frequency F and the quartic component of the rotational frequency Fb of the spinner 25 is 12.3 Hz so that the differences δ F between the vibrational frequency F and each component degree of the rotational frequency Fb of the spinner 25 become larger.

Figure 6:
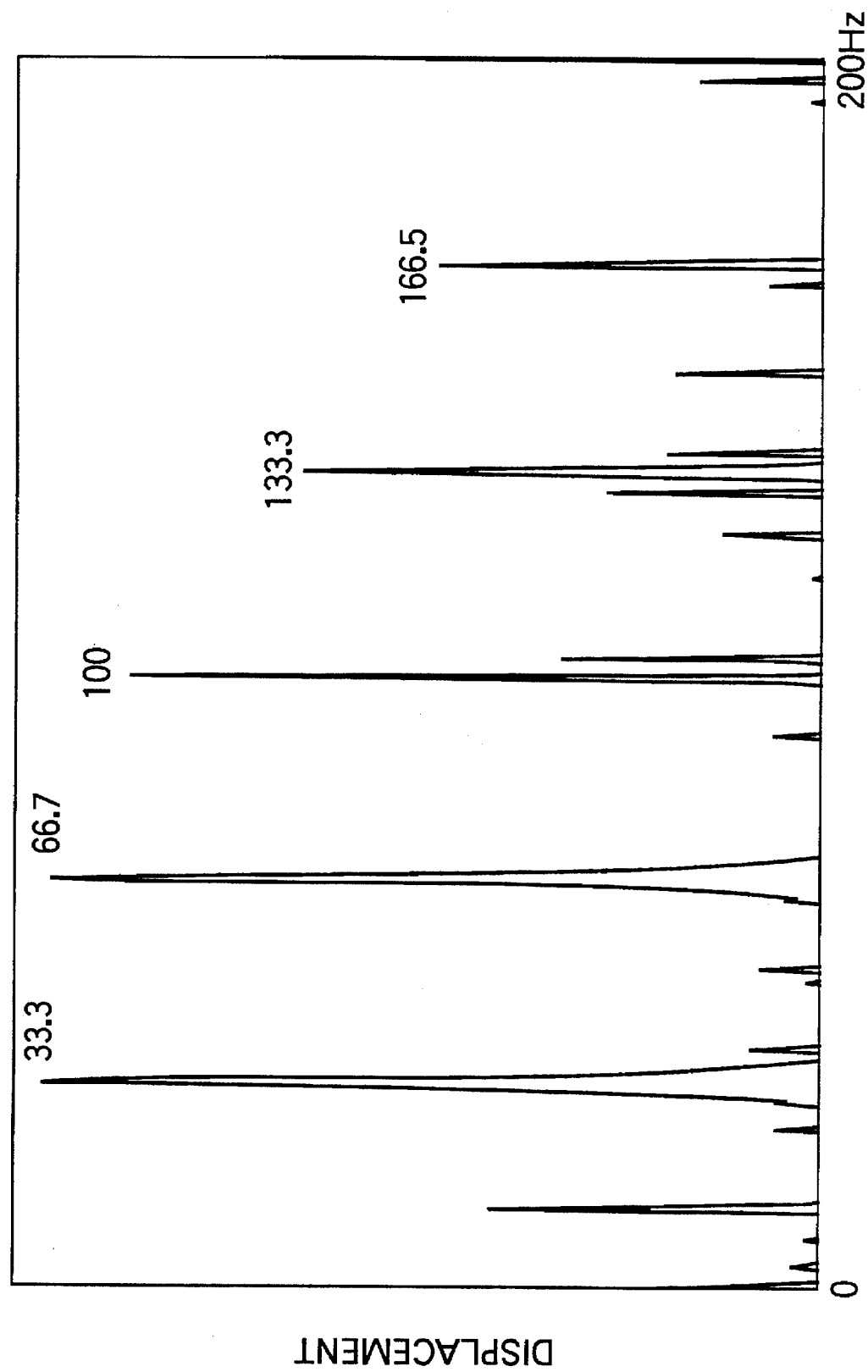
FIG. 6 is a graph showing the relationship between the axial displacement of a spinner and the rotational frequency.
Figure 7:
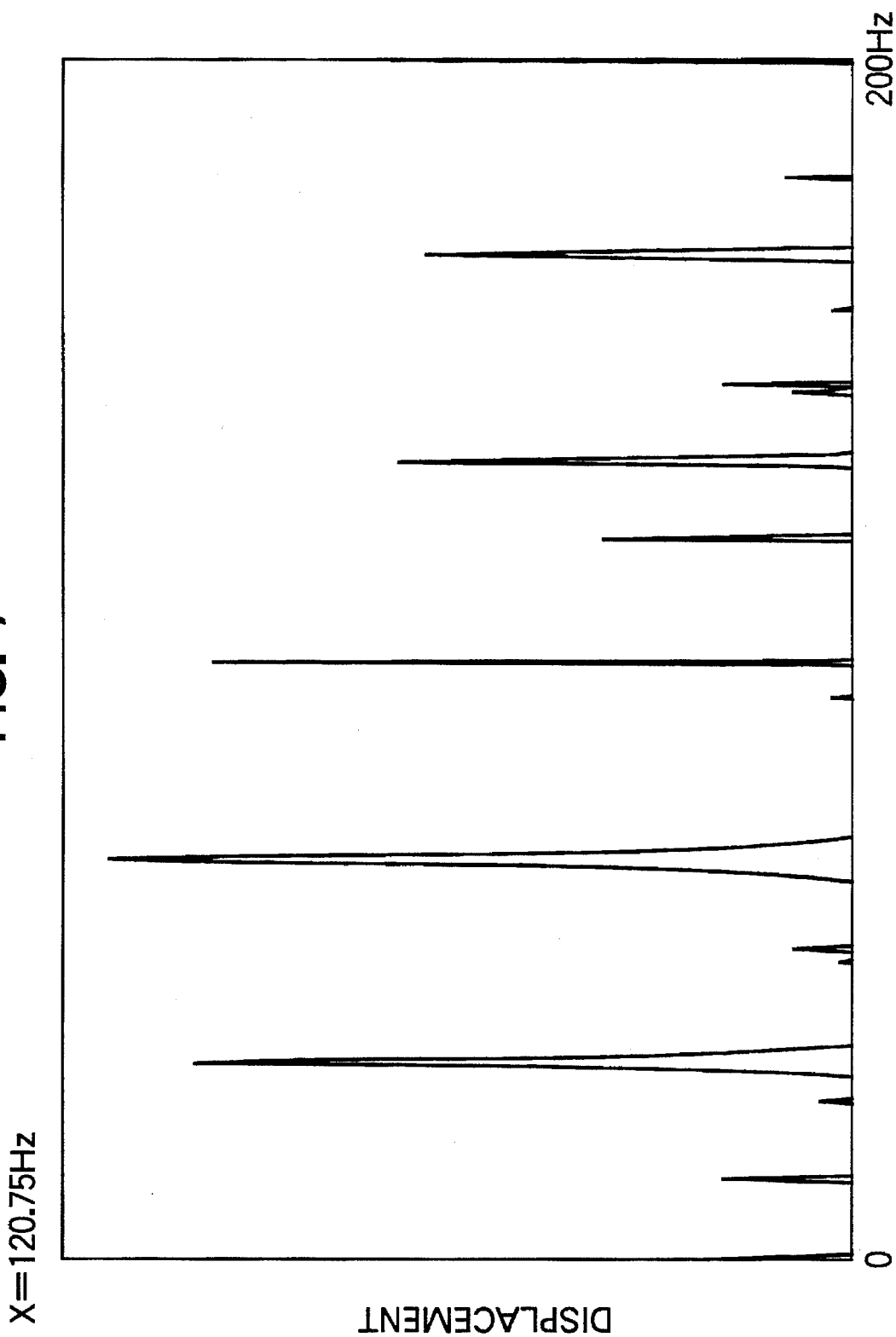
FIG. 7 is a graph showing the relationship between the axial displacement of a spinner and the rotational frequency.

FIGS. 6 and 7 are graphs showing the relationship between the axial displacement of the spinner 25 and the rotational frequency. FIG. 6 shows the experimental results obtained when z=8, Fc=12.919 Hz and FIG. 7 shows the experimental results obtained when z=9, Fc=13.44 Hz.

Since the spinner 25 is rotated at 2000 rpm by the spindle motor 28, it can be recognized from both FIGS. 6 and 7 that periodical vibration occurs at about 33.3 Hz, the primary component of the rotational frequency Fb of the spinner 25, 66.7 Hz, the secondary component, 100 Hz, the tertiary component, 133.3 Hz, the quartic component and 166.5 Hz, the quintic component.

In FIG. 6, non-periodical vibration caused by axial vibration of the bearing 40 occurs at the frequency of 103.35 Hz, while non-periodical vibration caused by axial vibration of the bearing 40 occurs at the frequency of 120.75 Hz in FIG. 7. Therefore, since the difference between the frequency at which non-periodical vibration caused by axial vibration of the bearing 40 occurs and the tertiary component of the rotational frequency Fb of the spinner 25 is only 3.35 Hz in FIG. 6, the image read has visibly recognizable wave-like unevenness, while since the difference between the frequency at which non-periodical vibration caused by axial vibration of the bearing 40 occurs and the tertiary component of the rotational frequency Fb of the spinner 25 is 12.3 Hz in FIG. 7, visibly recognizable wave-like unevenness are not contained in the image read.

Figure 8:
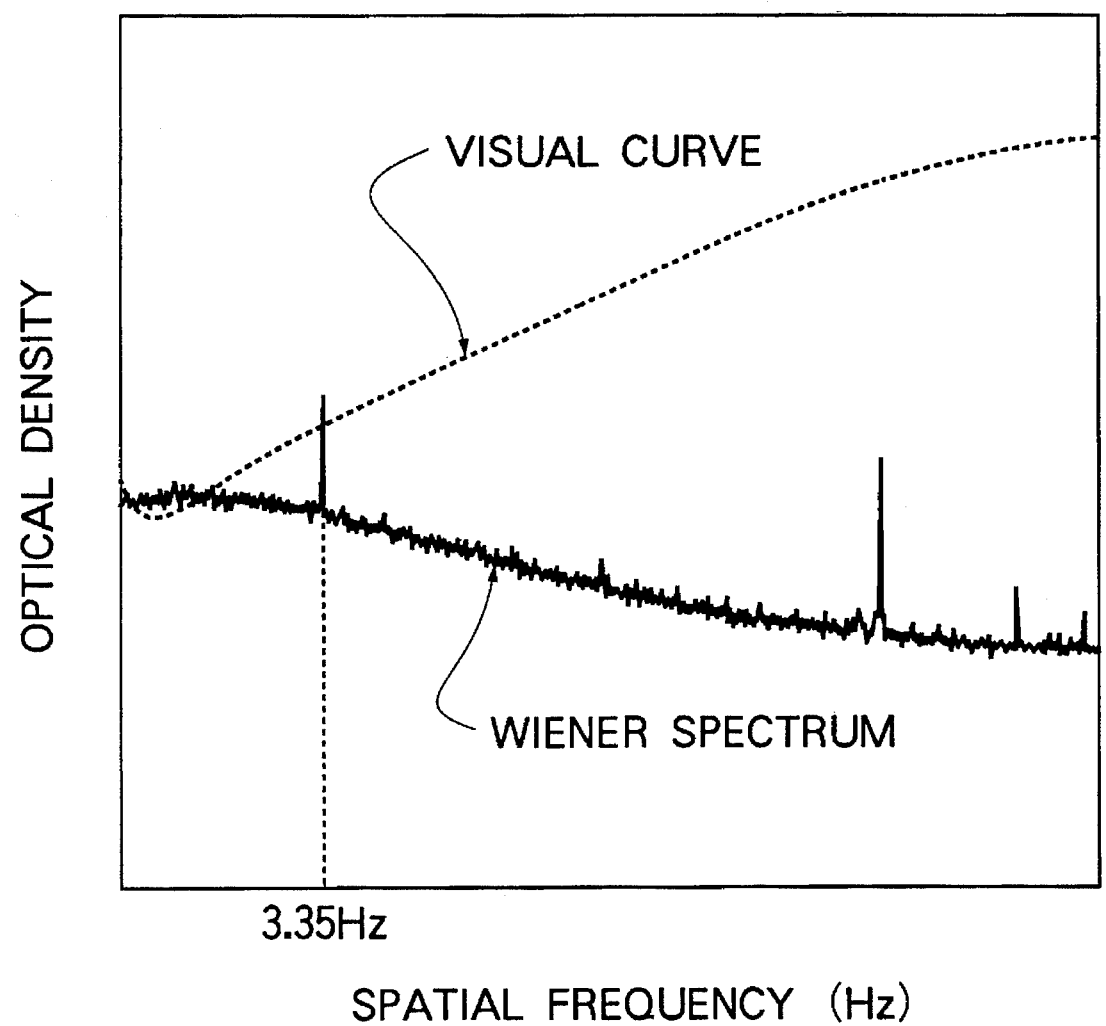
FIG. 8 is a graph showing the relationship between a visual curve and the Wiener spectrum of an image read by an image reading apparatus when a stimulable phosphor sheet was uniformly exposed to X-rays.
Figure 9:
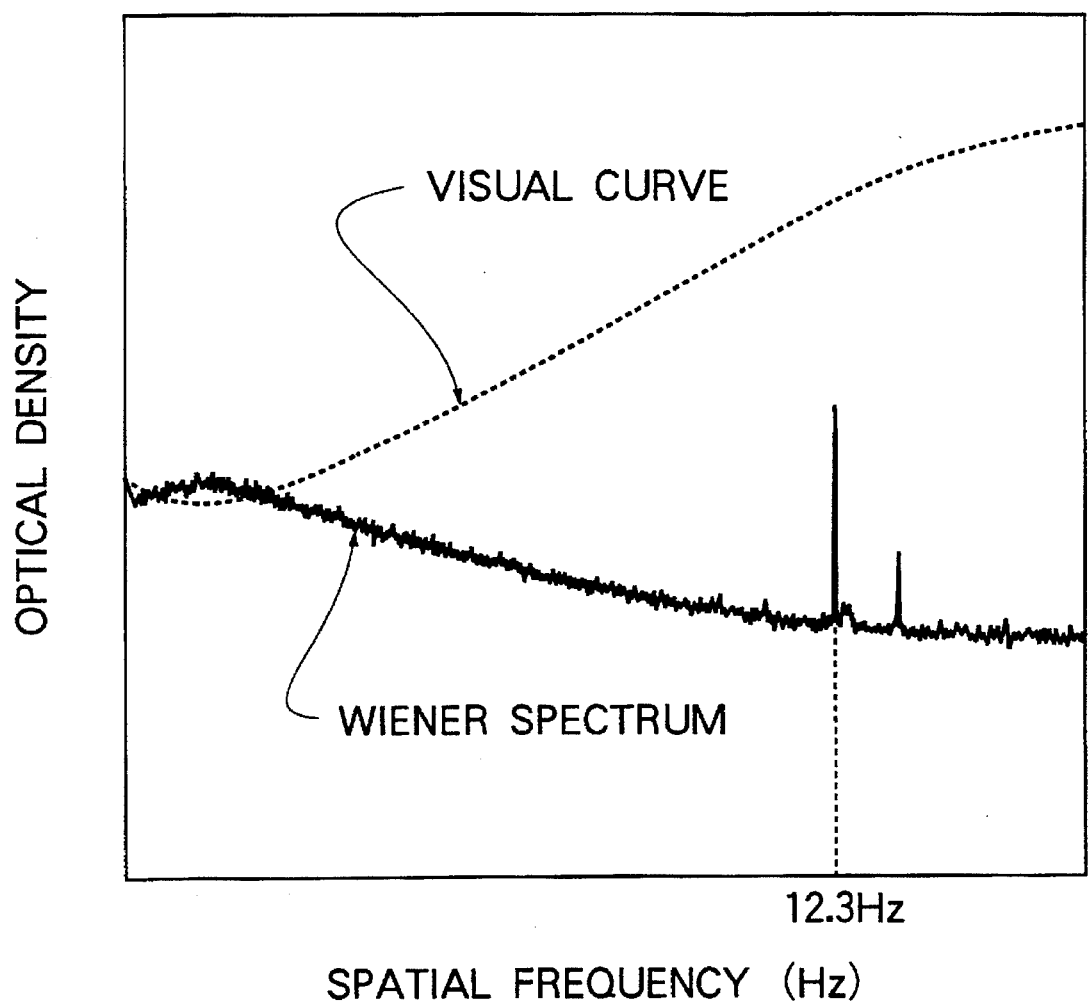
FIG. 9 is a graph showing the relationship between a visual curve and the Wiener spectrum of an image read by an image reading apparatus when a stimulable phosphor sheet was uniformly exposed to X-rays.

FIGS. 8 and 9 are graphs showing the relationship between a visual curve and the Wiener spectrum of an image read by the image reading apparatus when the stimulable phosphor sheet 2 was uniformly exposed to X-rays. FIG. 8 shows the experimental results in the case of z=8, Fc=12.919 Hz and FIG. 9 shows the experimental results in the case of z=9, Fc=13.44 Hz. In FIGS. 8 and 9, the ordinate axis indicates optical density and the abscissa axis indicates spatial frequency.

The visual curve was obtained by plotting the minimum optical density at which change in density can be read at each spatial frequency and was sensually determined. Above the visual curve, one can recognize wave-like unevenness, while no wave-like unevenness can be recognized below the visual curve.

In FIG. 8, image wave-like unevenness caused by axial vibration of the bearing 40 are produced at the frequency of 3.35 Hz and since the values of the visual curve are low when the spatial frequency is low as shown in FIG. 8, the image wave-like unevenness can be visually recognized as wave-like unevenness, whereby it is impossible to produce an image free from visually recognizable wave-like unevenness. On the contrary, in FIG. 9, since the spatial frequency at which wave-like image unevenness caused by axial vibration of the bearing 40 are produced is 12.3 Hz, the wave-like image unevenness cannot be visually recognized as wave-like unevenness, whereby it is possible to produce an image free from visually recognizable wave-like unevenness.

According to this embodiment, even if wave-like unevenness are produced in a read image due to non-periodical axial vibration of the bearing 40, since the wave-like unevenness can be made not to be visually recognizable, it is possible to prevent visually recognizable wave-like unevenness from being produced in an image.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although the vibrational frequency of the bearing 40 is set so that the difference δ F between the frequency at which non-periodical vibration caused by axial vibration of the bearing 40 occurs and the quartic component of the rotational frequency Fb of the spinner 25 is 12.3 Hz, the vibrational frequency of the bearing 40 need not to be set so that the difference δ F between the frequency at which non-periodical vibration caused by axial vibration of the bearing 40 occurs and the quartic component of the rotational frequency Fb of the spinner 25 is equal to 12.3 Hz and it is sufficient to set the vibrational frequency of the bearing 40 such that the difference δ F between the frequency at which non-periodical vibration caused by axial vibration of the bearing 40 occurs and the quartic component of the rotational frequency Fb of the spinner 25 is equal to or greater than about 8.2 Hz, preferably about 11.1 Hz.

Further, in the above described embodiment, although the vibrational frequency of the bearing 40 is changed by changing the number of the rolling elements 41, the vibrational frequency of the bearing 40 may be changed by changing the rotational frequency Fc of the rolling element support member 42 without changing the number of the rolling elements 41 or by changing both the number of the rolling elements 41 and the rotational frequency Fc of the rolling element support member 42.

Moreover, in the above described embodiment, a mirror which can transmit an extremely small amount of the incident laser beam 11 at a predetermined rate is used as the mirror 15, whereby the laser beam 11 transmitted through the mirror 15 is received by the light detector 16 and it is ensured by monitoring the intensity of the received laser beam 11 that the intensity of the laser beam 11 is always constant. However, the intensity of the laser beam 11 may be kept constant by other means.

Further, in the above described embodiment, the surface of the dichroic mirror 18 enters is processed so that an extremely small amount of the laser beam 11 is reflected, and the laser beam 11 reflected by the dichroic mirror 18 is received by the light detector 22 and the positions of the mirrors 14, 15 are finely adjusted by detecting whether or not the light axis of the laser beam 11 is located at a predetermined position. However, the position of the light axis of the laser beam 11 may be adjusted by other means.

Furthermore, in the above described embodiment, although the surface of the stimulable phosphor sheet 2 having the stimulable phosphor layer storing image data in the form of the energy of light, radiation or an electron beam is scanned with the laser beam 11 and an image is read by receiving light emitted from the stimulable phosphor layer, the sheet to be scanned is not limited to the stimulable phosphor sheet 2 and may be any of various kinds from which an image recorded therein can be read by irradiating it with light and receiving light such as reflected light therefrom.

According to the present invention, it is possible to provide a scanning apparatus comprising sheet holding means for holding a sheet to be scanned in the shape of a segment of a cylinder, a light source for irradiating the sheet with light, a spinner including light converging means for converging light from the light source on the surface of the sheet, and photoelectrical detecting means for photoelectrically detecting light from the sheet, a spindle motor including a plurality of rolling elements in a bearing for rotating the spinner coaxially with a center axis of the cylinder, and a sub-scanning device for moving the sheet holding means relative to the spinner in a direction parallel to the center axis, which apparatus can read an image which contains no visibly recognizable wave-like unevenness even when an image is read at high density at a reduced scanning pitch.

We claim:

1. A scanning apparatus comprising sheet holding means for holding a sheet to be scanned in a shape of a segment of a cylinder, a light source for irradiating the sheet with light, a spinner including light converging means for converging light from the light source on the surface of the sheet, and photoelectrical detecting means for photoelectrically detecting light from the sheet, a spindle motor including a plurality of rolling elements in a bearing for rotating the spinner coaxially with a center axis of the cylinder, and a sub-scanning device for moving the sheet holding means relative to the spinner in a direction parallel to the center axis, the rolling elements being provided so that a vibrational frequency F of the bearing satisfies a formula $Fb/6 \leq |F - n1 \times Fb| \leq Fb/2$ wherein Fb is a rotational frequency of the spindle motor and n1 is a positive integer.

2. A scanning apparatus in accordance with claim 1 wherein the rolling elements are provided so that the vibrational frequency F of the bearing satisfies a formula $Fb/3 \leq |F - n1 \times Fb| \leq Fb/2$ wherein Fb is a rotational frequency of the spindle motor and n1 is a positive integer.

3. A scanning apparatus in accordance with claim 2 wherein the vibrational frequency of the bearing is determined by selecting the number of the plurality of rolling elements.

4. A scanning apparatus in accordance with claim 3 wherein the sheet to be scanned is a stimulable phosphor sheet having a layer of stimulable phosphor which has been exposed imagewise to light, radiation or an electron beam and stores energy of the light, radiation or an electron beam in a form of an image, the light source is a stimulating light source for emitting an electromagnetic wave capable of exciting the stimulable phosphor and the light detecting means is constituted so as to photoelectrically detect light emitted from the layer of the stimulable phosphor stimulated by the electromagnetic wave.

5. A scanning apparatus in accordance with claim 2 wherein the sheet to be scanned is a stimulable phosphor sheet having a layer of stimulable phosphor which has been exposed imagewise to light, radiation or an electron beam and stores energy of the light, radiation or an electron beam in a form of an image, the light source is a stimulating light source for emitting an electromagnetic wave capable of exciting the stimulable phosphor and the light detecting means is constituted so as to photoelectrically detect light emitted from the layer of the stimulable phosphor stimulated by the electromagnetic wave.

6. A scanning apparatus in accordance with claim 1 wherein the vibrational frequency of the bearing is determined by selecting the number of the rolling elements.

7. A scanning apparatus in accordance with claim 3 wherein the sheet to be scanned is a stimulable phosphor sheet having a layer of stimulable phosphor which has been exposed imagewise to light, radiation or an electron beam and stores energy of the light, radiation or an electron beam in a form of an image, the light source is a stimulating light source for emitting an electromagnetic wave capable of exciting the stimulable phosphor and the light detecting means is constituted so as to photoelectrically detect light emitted from the layer of the stimulable phosphor stimulated by the electromagnetic wave.

8. A scanning apparatus in accordance with claim 1 wherein the sheet to be scanned is a stimulable phosphor sheet having a layer of stimulable phosphor which has been exposed imagewise to light, radiation or an electron beam and stores energy of the light, radiation or an electron beam in a form of an image, the light source is a stimulating light source for emitting an electromagnetic wave capable of exciting the stimulable phosphor and the light detecting means is constituted so as to photoelectrically detect light emitted from the layer of the stimulable phosphor stimulated by the electromagnetic wave.

* * * * *

UNITED STATES PATENT AND TRADEMARK OFFICE
CERTIFICATE OF CORRECTION

PATENT NO. : 5,642,182
DATED : June 24, 1997
INVENTOR(S) : Yukinori NISHIOKA et al.

It is certified that error appears in the above-identified patent and that said Letters Patent is hereby corrected as shown below:

On the title page, Item [30] FOREIGN APPLICATION PRIORITY DATA should read as follows:

Jan. 10, 1995 [JP] Japan .......7-002017

Signed and Sealed this

Thirtieth Day of December, 1997

*Attest:*

BRUCE LEHMAN

*Attesting Officer*     *Commissioner of Patents and Trademarks*